(12) United States Patent
Tsao et al.

(10) Patent No.: US 10,956,047 B2
(45) Date of Patent: Mar. 23, 2021

(54) ACCELERATED COMPUTER SYSTEM AND METHOD FOR WRITING DATA INTO DISCRETE PAGES

(71) Applicant: AccelStor, Inc., New Taipei (TW)

(72) Inventors: Shih-Chiang Tsao, New Taipei (TW); Ting-Fang Chien, New Taipei (TW); An-Nan Chang, New Taipei (TW)

(73) Assignee: ACCELSTOR TECHNOLOGIES LTD, Shanghai (CN)

( * ) Notice: Subject to any disclaimer, the term of this patent is extended or adjusted under 35 U.S.C. 154(b) by 154 days.

(21) Appl. No.: 15/009,897

(22) Filed: Jan. 29, 2016

(65) Prior Publication Data

US 2017/0168731 A1  Jun. 15, 2017

(30) Foreign Application Priority Data

Dec. 11, 2015 (TW) .............................. 104141826 A

(51) Int. Cl.
  *G06F 3/06* (2006.01)
  *G06F 12/0868* (2016.01)
  *G06F 12/08* (2016.01)
(52) U.S. Cl.
  CPC ............ *G06F 3/0613* (2013.01); *G06F 3/061* (2013.01); *G06F 3/068* (2013.01); *G06F 3/0656* (2013.01); *G06F 3/0659* (2013.01); *G06F 3/0676* (2013.01); *G06F 12/08* (2013.01); *G06F 12/0868* (2013.01); *G06F 2212/1024* (2013.01); *G06F 2212/21* (2013.01); *G06F 2212/224* (2013.01); *G06F 2212/461* (2013.01); *G06F 2212/70* (2013.01)

(58) Field of Classification Search
  CPC .... G06F 3/0613; G06F 3/0655; G06F 3/0656; G06F 3/0659; G06F 3/068; G06F 12/08; G06F 12/0866; G06F 12/0868; G06F 2212/1024; G06F 2212/21; G06F 2212/70; G06F 3/0635; G06F 3/0676; G06F 2212/224; G06F 2212/7205
  See application file for complete search history.

(56) References Cited

U.S. PATENT DOCUMENTS 5,459,842 A * 10/1995 Begun ................. G06F 13/1631
                                                                 710/68
5,557,770 A *  9/1996 Bhide ................... G06F 3/0601
                                                                 711/114

(Continued)

*Primary Examiner* — Andrew J Cheong
(74) *Attorney, Agent, or Firm* — McClure, Qualey & Rodack, LLP

(57) ABSTRACT

The instant disclosure provides an accelerated computer system and an accelerated method for writing data into discrete pages. The accelerated method includes executing write commands, with each write command including write data and a write address such that the write address corresponds to a write page of the first pages in a sector of a hard drive, identifying whether the write pages are successive according to the write addresses, acquiring stored data by reading the sector according to the write addresses if the write pages are discrete, writing the data stored in the first pages into the second pages of a memory, writing write data bit by bit into the second pages according to the write addresses, and writing the data stored in the second pages into the first pages.

6 Claims, 6 Drawing Sheets

(56) References Cited

U.S. PATENT DOCUMENTS

| | | | |
|---|---|---|---|
| 8,521,976 B1* | 8/2013 | Wu | G06F 3/061 |
| | | | 711/163 |
| 8,832,366 B1* | 9/2014 | Huynh | G06F 12/0868 |
| | | | 711/113 |
| 9,152,563 B2* | 10/2015 | Traut | G06F 12/0862 |
| 2002/0108017 A1* | 8/2002 | Kenchammana-Hoskote | |
| | | | G06F 12/0804 |
| | | | 711/113 |
| 2003/0023815 A1* | 1/2003 | Yoneyama | G06F 3/0611 |
| | | | 711/133 |
| 2005/0193164 A1* | 9/2005 | Royer, Jr. | B82Y 10/00 |
| | | | 711/113 |
| 2007/0234182 A1* | 10/2007 | Wickeraad | G06F 11/1008 |
| | | | 714/763 |
| 2010/0211731 A1* | 8/2010 | Mittendorff | G06F 12/0866 |
| | | | 711/113 |
| 2010/0290150 A1* | 11/2010 | Sumi | G06F 3/0613 |
| | | | 360/71 |
| 2012/0303877 A1* | 11/2012 | Benhase | G06F 12/123 |
| | | | 711/103 |
| 2013/0007381 A1* | 1/2013 | Palmer | G06F 12/0246 |
| | | | 711/154 |
| 2014/0379990 A1* | 12/2014 | Pan | G06F 12/0804 |
| | | | 711/135 |
| 2015/0067276 A1* | 3/2015 | Mito | G06F 3/0659 |
| | | | 711/151 |
| 2015/0095574 A1* | 4/2015 | Bisht | G06F 3/0659 |
| | | | 711/118 |
| 2015/0113088 A1* | 4/2015 | Metzler | G06F 12/0866 |
| | | | 709/212 |
| 2016/0239204 A1* | 8/2016 | Harada | G06F 3/061 |
| 2016/0239422 A1* | 8/2016 | Talukdar | G06F 12/0846 |
| 2016/0274792 A1* | 9/2016 | Ogawa | G06F 3/061 |
| 2016/0378656 A1* | 12/2016 | Kudo | G06F 12/0815 |
| | | | 711/143 |

* cited by examiner

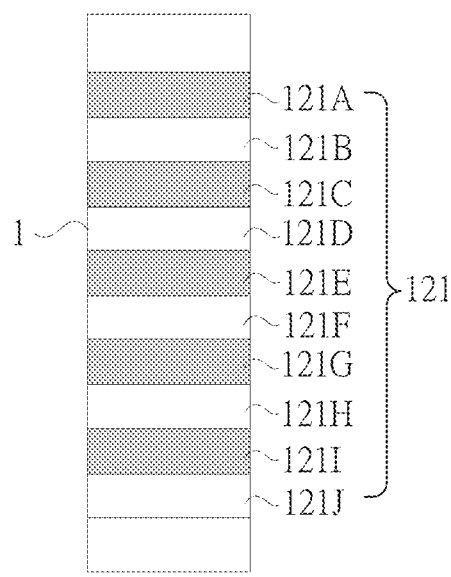
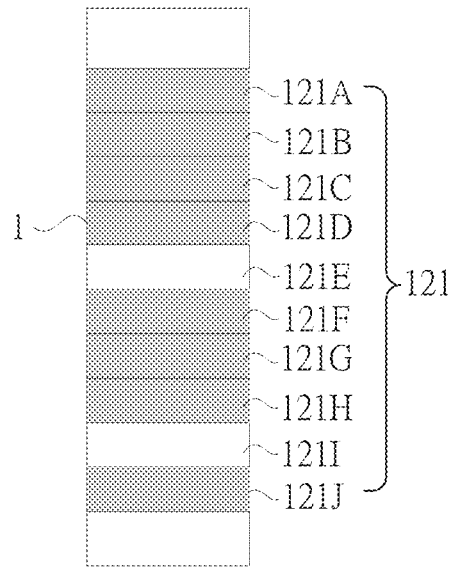
Fig.4A        Fig.4B
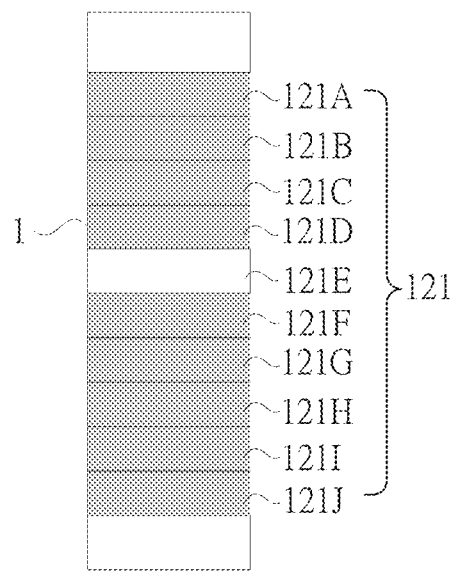
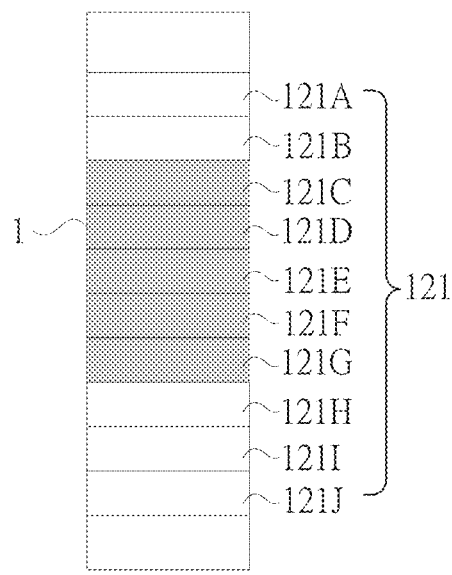
Fig.4C        Fig.4D

ACCELERATED COMPUTER SYSTEM AND METHOD FOR WRITING DATA INTO DISCRETE PAGES

CROSS-REFERENCES TO RELATED APPLICATIONS

This non-provisional application claims priority under 35 U.S.C. § 119(a) on Patent Application No. 104141826 filed in Taiwan, R.O.C. on 2015 Dec. 11, the entire contents of which are hereby incorporated by reference.

BACKGROUND

Technical Field

The instant disclosure relates to data writing computer system and method thereof, in particular to an accelerated computer system and method for writing data into discrete pages of a hard drive.

Related Art

With the advancement in technology and growth of electronics industry, the demand for data transfer continues to increase. To address this need, computer capabilities are enhanced. Yet, computers can only work when used along with software, such as an operating system (OS), gaming software, and video and audio software. When in operation, these software programs need to store data into a computer's hard drive, making it play a very important role in people's daily life.

A hard drive normally includes a plurality of read-write heads, at least one platter, a primary motor, a secondary motor, a main control chip, and cables. The read-write heads can draw concentric electromagnetic tracks on the surfaces of a platter. Each track can be broken up into equal sectors, and these sectors form the magnetic areas of the hard drive. The read-write heads can access data stored in the magnetic areas. When reading or writing data, the primary motor drives the platter to rotate, while the secondary motor moves the read-write heads over the corresponding locations of the platter. Then, the magnetic coil of the read-write heads detects the magnetization of the platter to read data from or write data to the magnetic areas.

However, when reading the magnetic areas, the conventional read-write heads have to move back and forth across different magnetic areas. Therefore, time is wasted by the back-and-forth motion of the read-write heads. Especially when writing data into discrete magnetic areas of the platter, the back-and-forth motion done by the read-write heads makes the write time too long.

SUMMARY

To address the above issues, the instant disclosure provides an accelerated computer system and method for writing data into discrete pages.

In one embodiment, the accelerated computer system for writing data into discrete pages comprises a hard drive, a memory, and a processor. The hard drive includes a read-write head and a magnetic track, and the magnetic track defines at least one sector, with the sector having a plurality of successive first pages. The memory has a plurality of second pages, where the write speed over the second pages is faster than that over the discrete first pages. The processor executes a plurality of write commands, with each write command having write data and a write address. The write address corresponds to a write page of the first pages. The processor determines whether the write pages are successive according to the write addresses. If the write pages are discrete, the processor reads the sector according to the write addresses and writes stored data of the first pages into the second pages. The processor also writes the write data into the second pages, and after the write data is written into the memory, the processor writes the stored data of each second page into the first pages.

In one embodiment, the accelerated method of writing data into discrete pages is applicable for a hard drive. The hard drive includes a read-write head and a magnetic region, where the magnetic region defines at least one sector, and the sector defines successive first pages. The write speed over the discrete first pages is less than that over a plurality of second pages in the memory. The method comprises: executing a plurality of write commands, with each write command including write data and a write address and the write address corresponds to a write page within the first pages; determining whether the write pages are successive according to the write addresses; reading the sector according to the write addresses if the write pages are discrete; writing stored data of the first pages of the sector into the second pages of the memory; writing the write data into the second pages according to the write addresses; and writing the stored data of the second pages of the memory into the first pages of the hard drive.

Based on the above, in accordance to an embodiment of the accelerated computer system and method for writing data into discrete pages, when writing data into the pages of the hard drive, the processor can begin with writing stored data in succession of discrete write pages in a disk sector into the second pages of a memory. Also, for data to be written into the hard drive, the processor writes the data into corresponding second pages. In comparing to the data within the hard drive, the second pages include updated or original stored data. Then, the processor writes all or a portion of the stored data of the second pages into the aforementioned sector of the hard drive. Hence, the pages within the sector can be written over successively according to the write addresses. Thus, the time wasted by writing into discrete pages can be reduced, and the write speed of the hard drive can be increased.

BRIEF DESCRIPTION OF THE DRAWINGS

FIG. 3C is a third schematic view of the data stored in the first and second pages in FIG. 1.

FIG. 3D is a fourth schematic view of the data stored in the first and second pages in FIG. 1.

FIG. 4A is a schematic view of a first embodiment for the first pages of FIG. 1 having discrete write pages.

FIG. 4B is a schematic view of a second embodiment for the first pages of FIG. 1 having discrete write pages.

FIG. 4C is a schematic view of a third embodiment for the first pages of FIG. 1 having discrete write pages.

FIG. 4D is a schematic view of one embodiment for the first pages of FIG. 1 having successive write pages.

DETAILED DESCRIPTION

Figure 1:
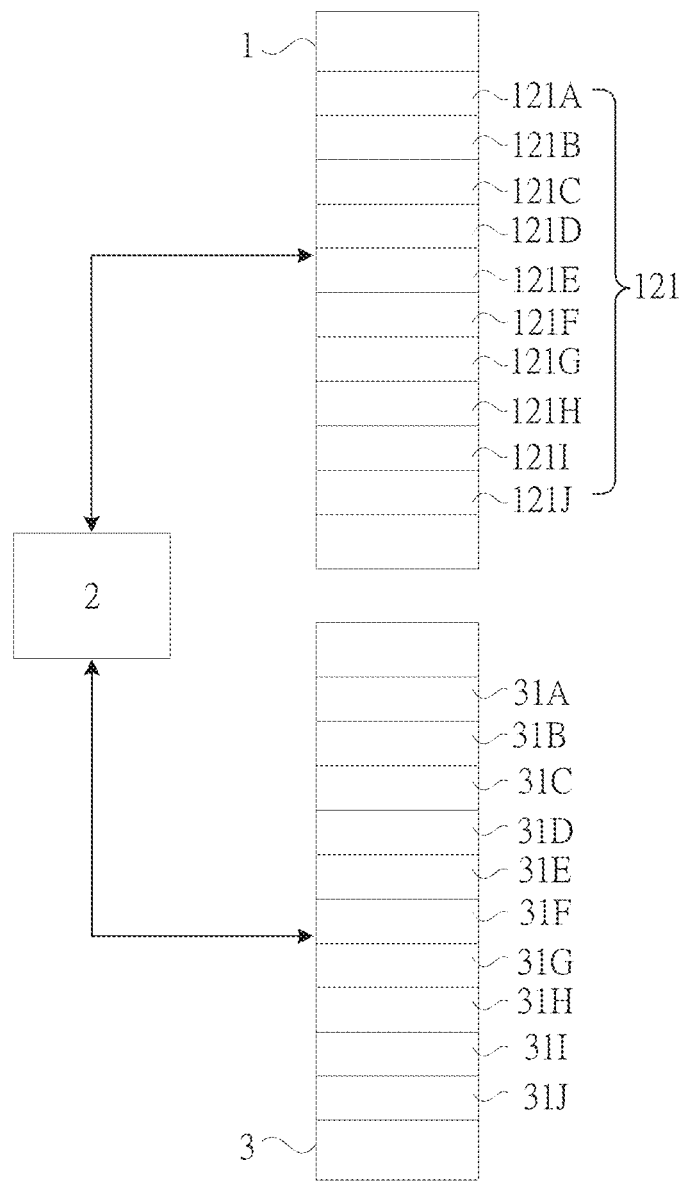
FIG. 1 is a functional block diagram for one embodiment of the computer system of the instant disclosure.
Figure 2:
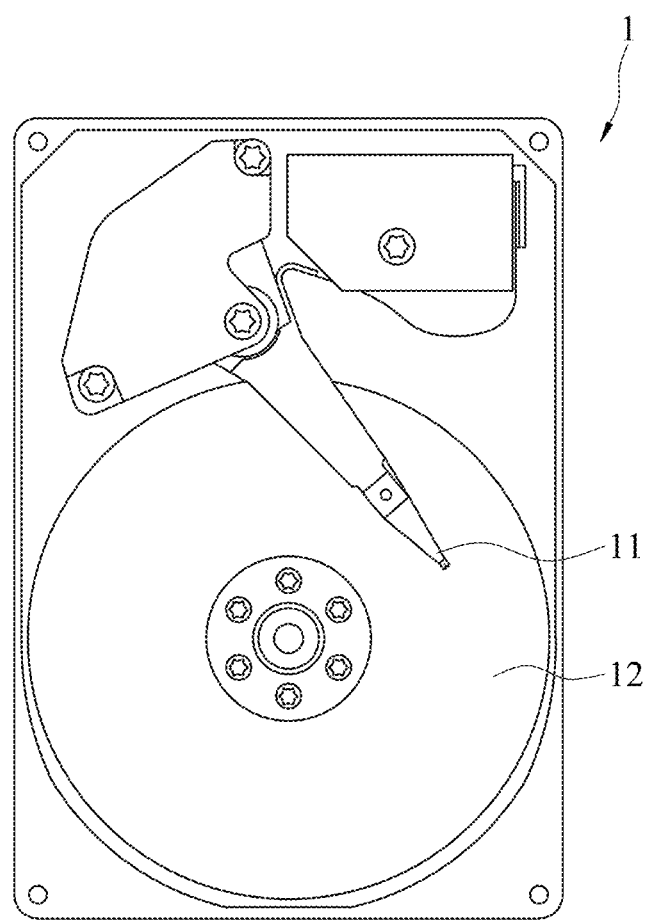
FIG. 2 is a schematic view showing the structural components for one embodiment of a hard drive in FIG. 1.

FIG. 1 shows a functional block diagram for one embodiment of the computer system of the instant disclosure. FIG. 2 is a schematic view of the components of one embodiment of a hard drive 1 in FIG. 1. Please refer to FIGS. 1 and 2 simultaneously. The computer system comprises the hard drive 1, a processor 2, and a memory 3, where the processor 2 is coupled to the hard drive 1 and the memory 3. As shown in FIG. 2, the hard drive 1 includes a read-write head 11 and a plurality of magnetic tracks 12 having magnetic areas. The read-write head 11 is used for reading data from or writing data to the magnetic tracks 12. For each magnetic track 12, its magnetic areas individually define at least one sector. The sector has a plurality of successive pages for holding data. As shown in FIG. 1, taking a sector 121 within the magnetic area of the hard drive 1 as an example, the sector 121 has a plurality of first pages 121A~121J arranged in succession. In other words, the addresses corresponding to the first pages 121A~121J are successive. For instance, for an 8 bit address and assuming the address corresponding to the first page 121A is 0x00, if the address increment is 0x02, for hexadecimal the corresponding addresses of the first pages 121A~121J are 0x00, 0x02, 0x04, 0x06, 0x08, 0x0a, 0x0c, 0xe, 0x10, and 0x12.

The memory 3 is used for data storage. As illustrated in FIG. 1, the memory 3 may include a plurality of second pages 31A~31J for holding data. In particular, the data write speed over the second pages 31A~31J is greater than that over discrete pages of the first pages 121A~121J. The reason being, the read-write head 11 of the hard drive 1 needs to move back and forth between discrete pages among the first pages 121A 121J. In practice, the memory 3 can be a static random-access memory (SRAM), a dynamic random-access memory (DRAM), a flash memory, or any memory having a write speed greater than that over the discrete pages of the hard drive 1.

The processor 2 is for executing write commands. The write commands may be generated by the front-end circuit that is electrically connected to the processor 2 or by the processor 2 on its own. Each of the write commands includes a write address and corresponding data, where the write address corresponds to a page within a sector of the hard drive 1. Taking FIG. 1 as an example, if the hard drive 1 receives the write address and write data from the processor 2, and the write address corresponds to the first pages 121A~121J of the sector 121, then the write data can be written into one of the write pages of the first pages 121A~121J. In practice, the processor 2 may utilize software or firmware with application programming interface (API) to access the hard drive 1. Buses are used to connect the processor 2 to the hard drive 1 so that they can communicate with each other and perform bus transaction. Whereas the processor 2 may be a central processing unit (CPU), a micro controlling unit (MCU), or a control circuit specific for integrated circuit (IC) application (Application-Specific IC; ASIC).

When the processor 2 is executing the write commands, since the time it takes for the read-write head 11 of the hard drive 1 to writing data into discrete pages of the magnetic tracks 12 is greater than that for successive pages, the processor 2 would first determine whether the write pages are successive or discrete based on the write addresses. If the write pages are successive, the processor 2 writes write data directly into the hard drive 1 to implement the write command. However, if the write pages are discrete, the processor 2 can implement the write command in an accelerated mode, in order to reduce the time wasted while writing into discrete pages.

For the accelerated mode, the processor 2 reads the pages of the write pages within a sector according to the write addresses. Taking the sector 121 as an example, the processor 2 reads all the stored data of the first pages 121A~121J of the sector 121 and writes the stored data into the second pages 31A~31J of the memory 3. Further, according to the write addresses, the processor 2 writes the write data bit by bit into the corresponding pages of the second pages 31A~31J. For instance, the write data to be written into the first page 121A is written into the second page 31A. Similarly, the write data to be written into the first page 121E is written into the second page 31E. After all the data has been written into the memory 3, the processor 2 writes the stored data of the second pages 31A~31J into the first pages 121A~121J of the hard drive 1. Thereby, the first pages 121A~121J of the hard drive 1 hold all of the updated write data. However, since the first pages 121A~121J are successive, when writing the stored data of the second pages 31A~31J into the first pages 121A~121J of the hard drive 1, the read-write head 11 does not have to travel back and forth. Hence, the write time can be shortened as compared to conventional techniques.

For the instant embodiment, the first pages 121A~121J and the second pages 31A~31J have a one-to-one mapping relationship. Based on this relationship, the processor 2 reads the stored data of the first pages 121A~121J and writes the stored data into the second pages 31A~31J. After the write data has been written into the memory 3, the processor 2 rewrites the stored data of the second pages 31A~31J into the first pages 121A~121J based on the one-to-one mapping relationship. It should be noted that the exemplary embodiment in FIG. 1 is based on successive second pages 31A~31J, but the instant disclosure is not restricted thereto.

In one embodiment, the second pages 31A~31J may be discrete. That is to say the addresses corresponding to the second pages 31A~31J can be discrete. Under such a circumstance, the processor 2 reads the stored data of the first pages 121A~121J and writes the stored data into the discrete second pages 31A~31J according to the abovementioned one-to-one mapping relationship. Then, after the write data has been written into the memory 3, the processor 2 reads the stored data of the discrete second pages 31A~31J and writes the stored data of the discrete second pages 31A~31J into the first pages 121A~121J according to the one-to-one mapping relationship. In other words, as long as the processor 2 is capable of obtaining the one-to-one mapping relationship between the first pages 121A~121J and the second pages 31A~31J (e.g., by lookup tables), the second pages 31A~31J can be dispersed among different regions in the memory 3 with discrete addresses.

Figure 3A:
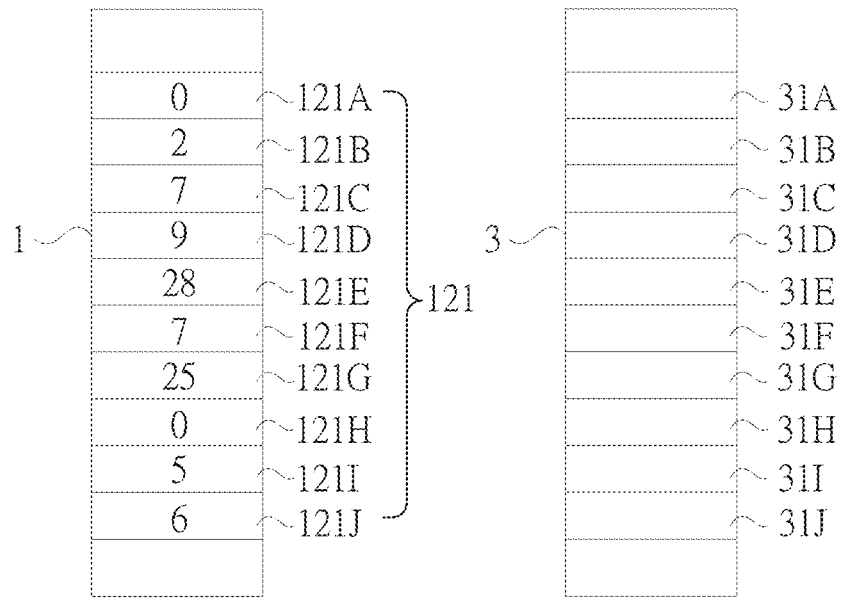
FIG. 3A is a first schematic view of the data stored in the first and second pages in FIG. 1.
Figure 3B:
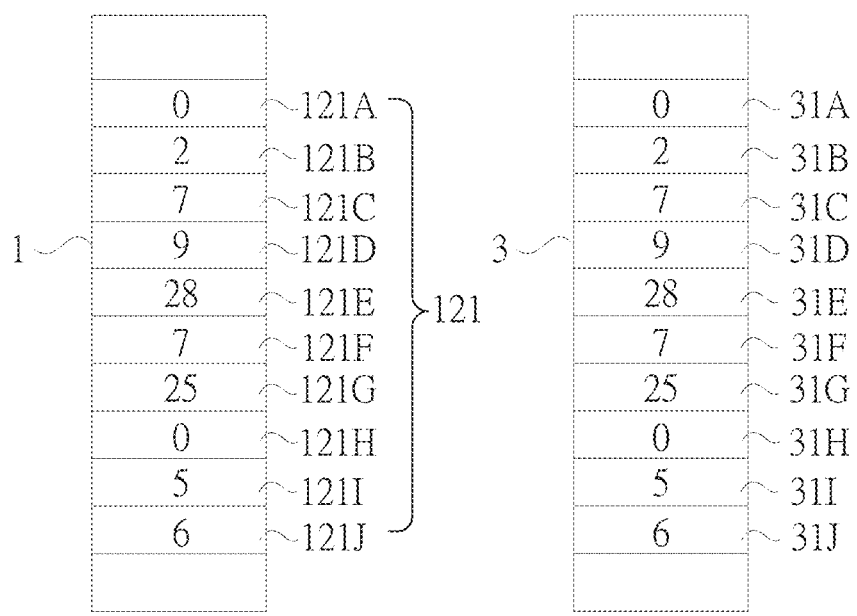
FIG. 3B is a second schematic view of the data stored in the first and second pages in FIG. 1.
Figures 3C, 3D:
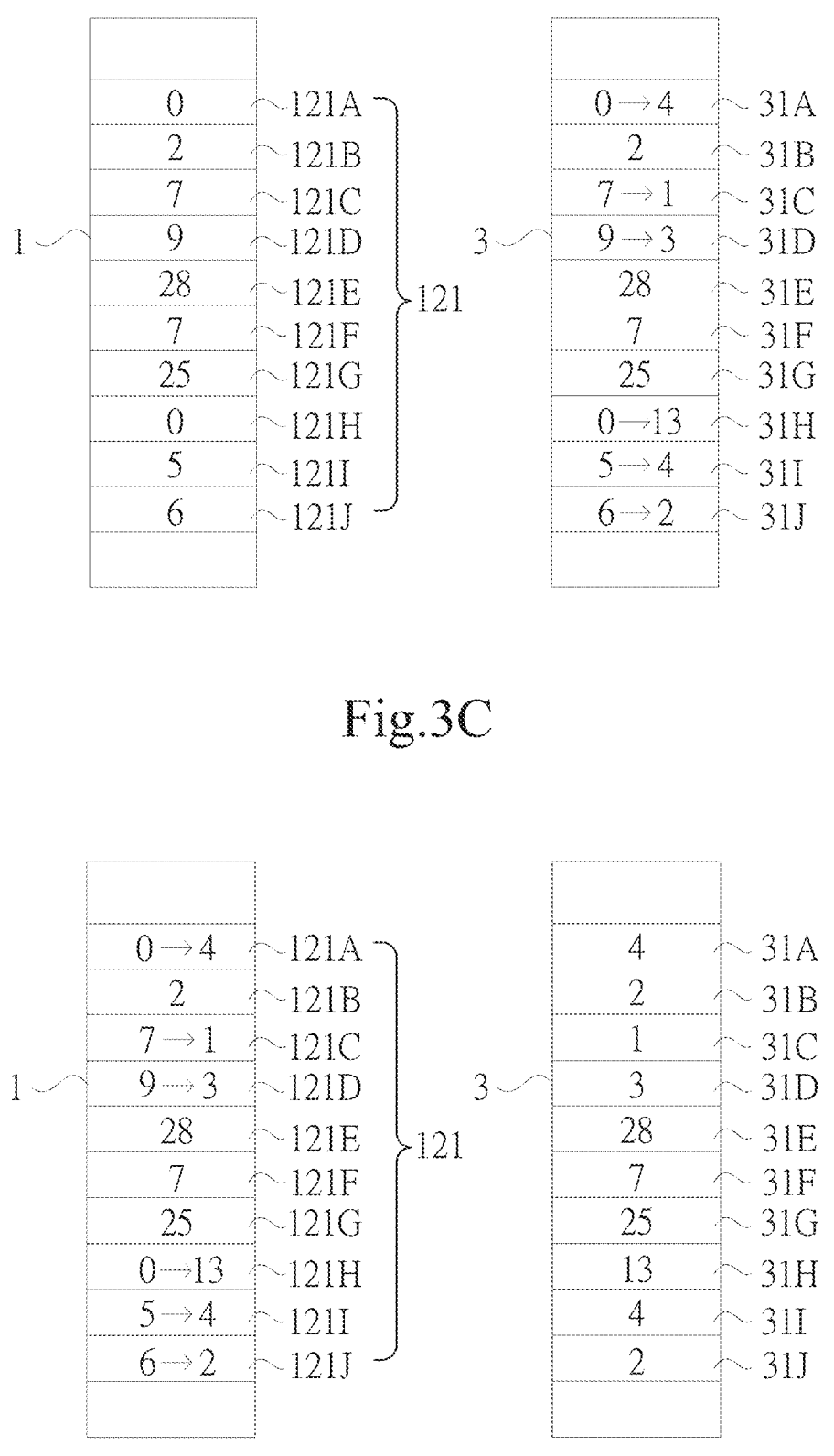

FIGS. 3A~3D are schematic views showing the data updating process of stored data of the first pages 121A~121J and the second pages 31A~31J of FIG. 1, with the processor 2 executing the write commands under the accelerated mode. The illustrations are based on six write data files. As shown in FIG. 3A, prior to any execution steps, the first pages 121A~121J include stored data, while the second pages 31A~31J do not include stored data like the first pages 121A~121J. As shown in FIG. 3B, under the accelerated mode, the processor 2 writes the stored data of the first pages 121A~121J into the second pages 31A~31J in a one-to-one manner, to make the stored data of the second pages 31A~31J same as the stored data of the first pages 121A~121J. Next, as shown in FIG. 3C, the processor 2 writes six pieces of write data namely "4", "1", "3", "13", "4", and "2" into the second pages 31A, 31C, 31D, 31H, 31I, and 31J, respectively, that correspond to six write addresses and overwrites original data. Lastly, as shown in FIG. 3D, the processor 2 writes the stored data of the second pages 31A~31J into the first pages 121A~121J in a one-to-one manner. Hence, the stored data of the first pages 121A, 121C, 121D, 121H, 121I, and 121J is updated to be "4", "1", "3", "13", "4", and "2", respectively, while other first pages 121B, 121E, 121F, and 121G keep the original stored data.

For the instant embodiment, when the processor 2 is determining whether the write pages are discrete, the processor 2 determines if there is any other first page in between any two write pages corresponding to the write addresses. If yes, the processor 2 determines the write pages are discrete. FIGS. 4A-4D show the schematic views of four embodiments of the first pages 121A~121J of FIG. 1 having discrete write pages and successive write pages. Taking the write pages of sector 121 as an example, the grey-colored first pages represent the write pages. As shown in FIG. 4A, each pair of the write pages has one non-write page in between, namely 121B, 121D, 121F, and 121H. As shown in FIG. 4B, the write pages (i.e., the first pages 121D and 121F; 121H and 121J), have non-write pages 121E and 121I sandwiched in between, respectively. As shown in FIG. 4C, two write pages (that is first pages 121D and 121F), has a non-write first page 121E in between. As shown in FIG. 4D, there is no page sandwiched in between the write pages of the first pages 121C~121G. Thus, based on FIGS. 4A-4D, as long as if any other first page is in between two write pages, the write pages are taken as discrete.

Furthermore, prior to determining whether the write pages are discrete, the processor 2 first determines whether the number of write pages is greater than or equal to half of the number of total pages in the sector based on the write addresses. Taking FIG. 1 as an example and assuming the write pages are in the sector 121, the processor 2 determines whether the number of write pages in sector 121 is greater than or equal to half of the number of first pages 121A~121J (i.e., five). If the number of write pages in sector 121 is greater than or equal to five, the processor 2 starts to determine whether the write addresses are successive. However, if the number of write pages in sector 121 is less than five, regardless whether the write pages are successive or discrete, the processor 2 writes write data directly into the write pages of the first pages 121A~121J. For example, assuming the processor 2 intends to executes five write commands, with the write pages of three write commands being in the sector 121, since the number of write pages is less than five, the processor 2 directly writes the write data bit by bit into the three write pages without determining whether they are successive or not. On the other hand, if the write pages of all five write commands are in the sector 121, since the number of write pages is five, the processor 2 proceeds to determine whether those five write pages are successive.

In one embodiment, the write pages are located between two first pages within the range of 121A~121J. Taking the write pages in the sector 121 as an example, after the processor 2 has determined that the number of write pages is greater than or equal to five and the write pages are discrete, the processor 2 reads the stored data between the two first pages. Based on the one-to-one mapping relationship, the processor 2 writes the stored data between the two first pages into the corresponding second pages. In other words, the processor 2 is capable of writing stored data of the first pages for a portion of the sector 121 into the memory 3 according to the write address status.

For example, if the write addresses correspond to the first pages 121B, 121D, 121E, 121G, and 121I, under such a circumstance, when the write pages are located between the first pages 121B and 121I, the processor 2 reads the stored data from the first pages 121B~121I. Then, based on the aforementioned one-to-one mapping relationship, the processor 2 writes the stored data of the first pages 121B~121I into the corresponding pages of the second pages 31A~31J, such as the second pages 31B~31I or different locations in the memory 3 with discrete addresses.

Next, according to the write addresses, the processor 2 writes the write data bit by bit into the corresponding pages of the second pages 31B~31I of the memory 3. For instance, the write data to be written into the first page 121B is written into the second page 31B, and the write data to be written into the first page 121D is written into the second page 31D. After all the data has been written into the memory 3, based on the aforementioned one-to-one mapping relationship, the processor 2 rewrites the stored data of the second pages 31A~31J corresponding to the first page range of 121B to 121I back to the first pages 121B~121I within the range of 121A~121J. In other words, the processor 2 writes the stored data of the second pages 31B~31I back to the first pages 121B~121I, such as writing the stored data of the second page 31B into the first page 121B. Hence, the first pages 121B~121I of the hard drive 1 are stored with updated write data. Since the first pages 121B~121I are successive, when writing the stored data of the second pages 31B~31I into the first pages 121B~121I of the hard drive 1 in a single operation, the read-write head 11 does not have to move back and forth, which helps reduce the write time as comparing to the conventional technique.

Figure 5:
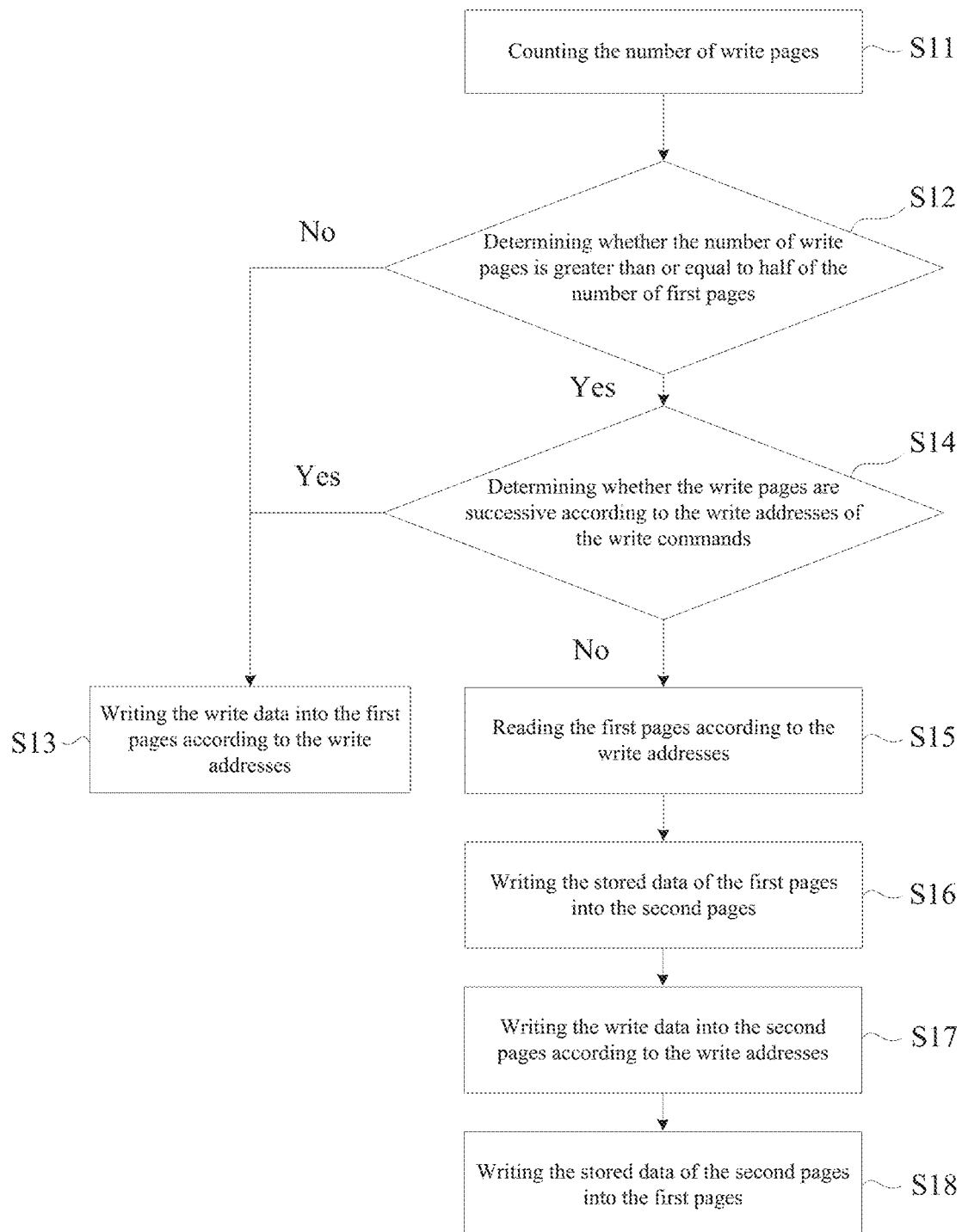
FIG. 5 is a flowchart of a method for accelerating data writing into discrete pages for one embodiment of the instant disclosure.

FIG. 5 is a flowchart of the accelerated method of writing data into discrete pages for one embodiment of the instant disclosure. Please refer to FIGS. 1 and 5 simultaneously. As an example, when the write commands include write pages corresponding to the sector 121, the processor 2 executes these write commands and counts the number of write pages (step S11). The processor 2 then determines whether the number of write pages is greater than or equal to half of the number of first pages 121A~121J (step S12) before determining whether to perform step S14. If no, the processor 2 writes the write data into the write pages of the first pages 121A~121J according to the write addresses (step S13). In other words, the processor 2 is not operated under the accelerated mode. However, if yes, according to the write addresses of the write commands, the processor 2 determines whether the write pages are successive (step S14). After implementing step S14, if the write pages are successive (i.e., "yes"), the processor 2 proceeds to execute step S13, which means the processor 2 does not operate under the accelerated mode. However, if the write pages are discrete (i.e., "no), the processor 2 reads the first pages 121A~121J of the sector 121 according to the write addresses (step S15). Then, the processor 2 writes the stored data of the first pages 121A 121J into the second pages 31A~31J of the memory 3 (step S16). After step S16 is completed, the processor 2 writes the write data into the second pages 31A~31J according to the write addresses (step S17). Finally, the processor 2 writes the stored data of the second pages 31A~31J into the first pages 121A~121J (step S18).

In step S14, the processor 2 determines whether there is any other first page existing between any two write pages of the corresponding write addresses. If yes, the processor 2 determines that the write pages are discrete and proceeds to step S15.

In some embodiments, the second pages 31A~31J of the memory 3 have a one-to-one mapping relationship with the first pages 121A~121J of the hard drive 1, while the second pages 31A~31J are discrete. In step S16, according to the abovementioned one-to-one mapping relationship, the processor 2 writes the stored data of the first pages 121A~121J into the discrete second pages 31A~31J. In step S18, based on the same one-to-one mapping relationship, the processor 2 writes the stored data of the discrete second pages 31A~31J into the first pages 121A~121J.

In one embodiment, if the number of write pages is greater than or equal to five, with the write pages falling in the range of 121B~121I of the first pages 121A~121J, the processor 2 in step S15 reads the stored data that falls in the range of 121B~121I (i.e., first pages 121B~121I). For step S16, based on the aforementioned one-to-one mapping relationship, the processor writes the stored data within the range of 121B~121I to the successive or discrete pages of the second pages 31A~31J, such as second pages 31B 31I. Then, in step S18, based on the aforementioned one-to-one mapping relationship, the processor 2 writes the stored data of the second pages 31A~31J corresponding to the range of 121B~121I into the write pages ranging from 121B to 121I and overwrites the original data.

Based on the above, in accordance to an embodiment of the accelerated computer system and method for writing data into discrete pages, when writing data into the pages of a hard drive, the processor can begin with writing stored data in succession of discrete write pages of a disk sector into the second pages of a memory. Also, for data to be written into the hard drive, the processor writes the data into the corresponding second pages. In comparing to the data within the hard drive, the second pages include updated or original stored data. Then, the processor writes all or a portion of stored data of the second pages into the aforementioned sector of the hard drive. Hence, the pages within the sector can be written over successively according to the write addresses. Thus, the time wasted by writing into discrete pages can be reduced, and the write speed of the hard drive can be increased.

While the instant disclosure has been described by way of example and in terms of the preferred embodiments, it is to be understood that the instant disclosure needs not be limited to the disclosed embodiments. For anyone skilled in the art, various modifications and improvements within the spirit of the instant disclosure are covered under the scope of the instant disclosure. The covered scope of the instant disclosure is based on the appended claims.

What is claimed is:

1. An accelerated computer system for writing data into discrete pages, comprising:
   a hard drive including a read-write head and a magnetic track, the magnetic track defining at least one block, the block having a plurality of successive first pages; and the read-write head reading data from or writing data to the magnetic track, wherein each of the first pages corresponds to a page address, and page addresses corresponding to the first pages are successive;
   a memory having a plurality of second pages, wherein the write speed over the second pages is faster than that over discrete first pages; and
   a processor for executing a plurality of write commands, each write command including write data and a write address of a write page, each of the write pages is one of the first pages to be written, and the other first pages that are not to be written are unwritten pages; the processor determines whether the write pages in a write range are discrete, wherein the write range is formed by two of the write pages that are separated the farthest in relation to the write addresses, and pages located in the write range at least include all of the write pages;
   wherein when the pages located in the write range only include all the write pages, the processor determines the write pages are not discrete and writes the write data into the write pages according to the write addresses; and
   wherein when the pages located in the write range further include at least one of the unwritten pages, the processor determines the write pages are discrete, and the processor: reads stored data of all the pages located in the write range; writes the stored data read from the pages located in the write range into a plurality of corresponding pages of the second pages, wherein each of the corresponding pages corresponds to one of the pages located in the write range, and an amount of the corresponding pages is the same as an amount of the pages located in the write range; writes the write data into the corresponding pages; and writes stored data of the corresponding pages to overwrite the pages located in the write range,
   wherein prior to determining whether the write pages in the write range are discrete, the processor counts a number of write pages according to the write addresses, and compares the counted number to a number of the first pages of the block, and wherein the processor then proceeds to write the write data into the write pages according to the write addresses without determining whether the write pages in the write range are discrete when the number of the write pages is not greater than or equal to half of the number of the first pages.

2. The accelerated computer system of claim 1, wherein the second pages are discrete and have a one-to-one mapping relationship with the first pages, with the processor writing the stored data of the first pages from the hard drive into the corresponding pages of the discrete second pages according to the one-to-one mapping relationship, and wherein the processor writes the stored data of the corresponding pages of the discrete second pages to overwrite the pages located in the write range according to the one-to-one mapping relationship after the write data is written into the memory.

3. The accelerated computer system of claim 1, wherein the second pages and the first pages have a one-to-one mapping relationship, while if the number of the write pages is greater than or equal to half the number of the first pages and the processor determined the write pages are discrete, the processor reads the stored data of all the pages located in the write range and writes the stored data read from the pages located in the write range into the corresponding pages of the second pages according to the one-to-one mapping relationship, and wherein after the processor has written the write data into the memory, the processor writes the stored data of the corresponding pages of the second pages to overwrite the pages located in the write range in accordance with the one-to-one mapping relationship.

4. An accelerated method of writing data into discrete pages for use with a hard drive, the hard drive including a read-write head and a magnetic region, the magnetic region defining at least one block, the block having a plurality of successive first pages, each of the first pages corresponds to a page address, page addresses corresponding to the first pages are successive, the write speed over discrete first pages being less than that in a plurality of second pages of the memory, comprising:

executing a plurality of write commands, with each write command including write data and a write address of a write page, wherein each of the write pages is one of the first pages to be written, and the other first pages that are not to be written are unwritten pages;

determining whether the write pages in a write range are discrete, wherein the write range is formed by two of the write pages that are separated the farthest in relation to the write addresses, and pages located in the write range at least include all of the write pages;

when the pages located in the write range only include all the write pages, determining the write pages are not discrete;

when determined the write pages are not discrete, writing the write data into the write pages according to the write addresses;

when the pages located in the write range further include at least one of the unwritten pages, determining the write pages are discrete; and when determined the write pages are discrete, reading stored data of all the pages located in the write range, writing the stored data read from the pages located in the write range into a plurality of corresponding pages of the second pages, writing the write data into the corresponding pages, and writing stored data of the corresponding pages to overwrite the pages located in the write range, wherein each of the corresponding pages corresponds to one of the pages located in the write range, and an amount of the corresponding pages is the same as an amount of the pages located in the write range, wherein prior to determining whether the write pages in the write range are discrete, the method further comprises:

counting a number of write pages;

determining whether the number of the write pages is greater than or equal to half of a number of the first pages; and responsive to determining that the number of the write pages is not greater than or equal to half of the number of the first pages, performing the step of writing the write data into the write pages according to the write addresses without determining whether the write pages in the write range are discrete.

5. The accelerated method of claim 4, wherein the second pages are discrete with the second pages and the first pages having a one-to-one mapping relationship, the step of writing the stored data read from the pages located in the write range into the plurality of corresponding pages of the second pages is performed according to the one-to-one mapping relationship, and wherein the step of writing the stored data of the corresponding pages to overwrite the pages located in the write range is performed according to the one-to-one mapping relationship.

6. The accelerated method of claim 4, wherein the second pages and the first pages have a one-to-one mapping relationship, while if the number of the write pages is greater than or equal to half of the number of the first pages, performing the step of determining whether the write pages in the write range are discrete;

wherein the step of writing the stored data read from the pages located in the write range into the plurality of corresponding pages of the second pages is performed according to the one-to-one mapping relationship, and wherein the step of writing the stored data of the corresponding pages to overwrite the pages located in the write range is performed in accordance to the one-to-one mapping relationship.

\* \* \* \* \*